June 7, 1927.

L. O. CULVER 1,631,522

CAP FASTENING MEANS FOR PRESERVING JARS

Filed Aug. 25, 1925

2 Sheets-Sheet 1

Witnesses:

Inventor
Lewis O. Culver
by Joshua R. H. Potts
his Attorney

June 7, 1927. 1,631,522
L. O. CULVER
CAP FASTENING MEANS FOR PRESERVING JARS
Filed Aug. 25, 1925 2 Sheets-Sheet 2
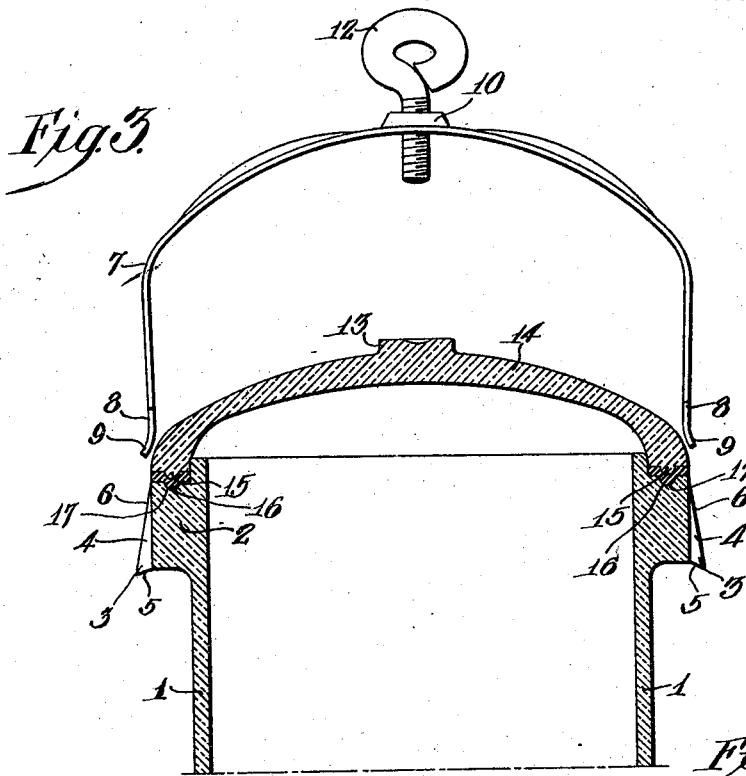
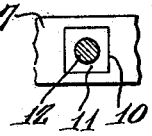
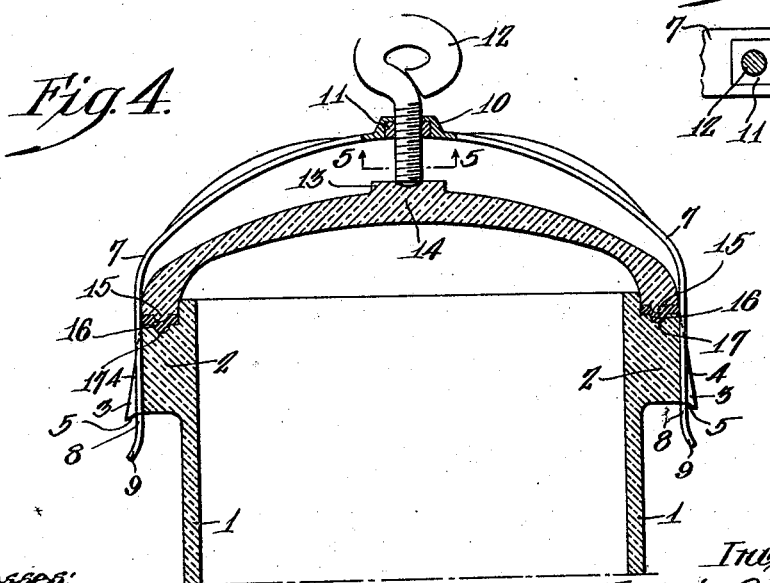

Patented June 7, 1927.

1,631,522

UNITED STATES PATENT OFFICE.

LEWIS O. CULVER, OF WEST PITTSTON, PENNSYLVANIA, ASSIGNOR, BY DIRECT AND MESNE ASSIGNMENTS, TO CULVER-BEVAN FRUIT JAR COMPANY, OF WILKES-BARRE, PENNSYLVANIA.

CAP-FASTENING MEANS FOR PRESERVING JARS.

Application filed August 25, 1925. Serial No. 52,283.

My invention relates to cap fastening means for preserving jars and its objects are to provide fastening means of simple and strong construction with which a jar may be quickly sealed and opened, with which any degree of sealing pressure may be easily applied without danger of the parts slipping out of place, and which will maintain the sealing pressure on the cap indefinitely.

Figure 1:
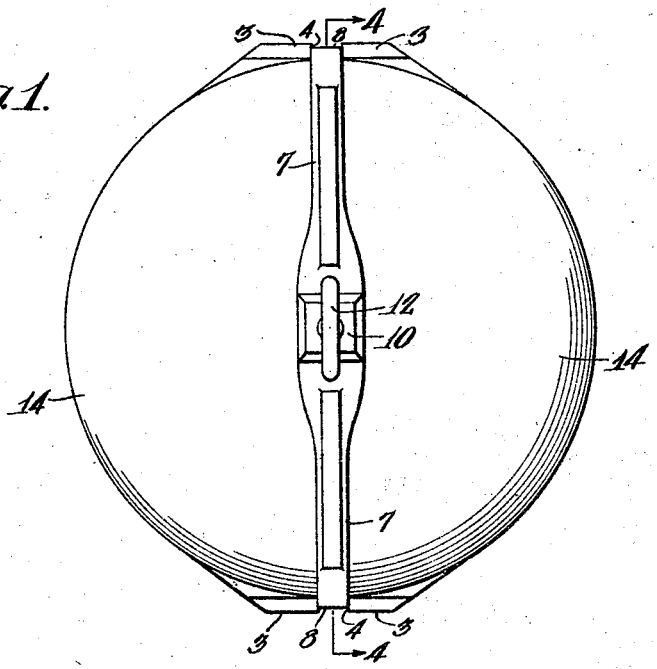
Figure 2:
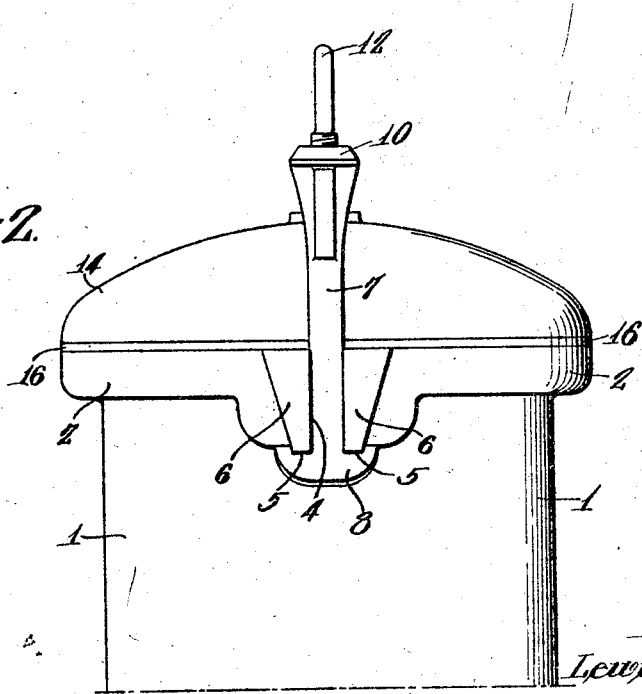

These objects, and other advantageous ends which will be described hereinafter, I attain in the following manner, reference being had to the accompanying drawings in which Figure 1 is a plan view of the jar having my fastening means applied thereto, Figure 2 is a side elevation of the jar shown in Figure 1, Figure 3 a section on line 4—4 of Figure 1 showing the parts in detached position, Figure 4 a similar view showing the parts in attached position, and Figure 5 a fragmentary section on line 5—5 of Figure 4.

Referring to the drawings, 1 indicates a jar reinforced at its edge by a thickened part 2; 3 a pair of lugs on the thickened part having vertical grooves 4 therein, their under faces 5 inclined outwardly and downwardly and their front faces 6 inclined upwardly and inwardly; 7 a yoke of spring metal having T-shaped ends 8 adapted to slide down the inclined front faces 6 to fit into grooves 4 and engage the inclined under faces 5; 9 lips on the T-shaped ends by which they may be gripped and sprung apart; 10 a socket in the center of the yoke for receiving and holding a nut 11; 12 a thumb screw threaded in nut 11 and arranged to take into a hollow in a raised part 13 on a cap 14; 15 an annular tenon adapted to force a gasket 16 into an annular mortise 17 in thickened part 2 when pressure is applied by screw 12 to make a seal.

To seal the jar, gasket 16 is placed on mortise 17 and cap 14 placed on the gasket. Yoke 7, which is of spring metal, is slipped into place by sliding the T-shaped ends 8 down from the position shown in Figure 3 down the inclined side faces 6 until the T-shaped ends snap into engagement with the inclined under faces 5 of the lugs as shown in Figure 4. Screw 12 is then turned until its end is within the hollow of raised part 13. By further turning the screw any degree of sealing pressure may be placed on gasket 16. One or two turns of the screw is sufficient to produce a sealing pressure for ordinary purposes.

To open the jar, screw 12 is unscrewed and the ends of the yoke 7 sprung apart by gripping the lips 9 with the fingers and pulling the T-shaped ends apart so that they clear the lugs 3, after which the yoke may be removed and cap 14 lifted off the jar.

It will be seen that with the fastening means set forth, jars may be easily and quickly sealed or opened by a child or other person of equal strength; inclined faces 5 will prevent the ends 8 of the yoke from springing apart while sealing the jar; the grooves 4 in conjunction with the inclined faces 5 prevent the yoke from being accidentally knocked out of sealing position and socket 10 forms an efficient holder for nut 11 on a yoke made of light spring metal.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. Cap fastening means for jars including lugs secured to the opposite sides of the jar having vertical grooves and inclined under faces; said lugs having front faces inclining toward the top of the jar; a yoke having T-shaped ends adapted to fit in the grooves and engage the inclined under faces; threaded means in the yoke, and means engaging therewith for holding the cap to the jar.

2. Cap fastening means for jars including lugs secured to the opposite sides of the jar and having vertical grooves, inclined under faces and inclined front faces; a yoke having T-shaped ends adapted to slide along the inclined front faces and snap into the grooves and engage the inclined under faces, and a nut secured in the yoke, and a bolt threaded to the nut for holding the cap to the jar under a desired pressure.

3. Cap fastening means for jars including grooved lugs at opposite sides of the jar having inclined under faces; a yoke having T-shaped ends adapted to fit in the grooves and under the lugs and a socket between the ends; a nut secured in the socket, a screw threaded to the nut for holding the cap to the jar, said lugs having inclined faces for effectively preventing said yoke from leaving said grooves.

4. Cap fastening means for jars including grooved lugs at opposite sides of the jar having inclined side faces and inclined under faces; a yoke made of spring metal reinforced to effect added resistance thereof in one direction without diminishing resiliency in the other direction; and having T-shaped ends adapted to fit in the grooves and under the lugs and lips extending from the T-shaped ends whereby said ends may be gripped and sprung apart, a screw in the yoke for holding the cap to the jar, said inclined front faces effectively preventing said yoke from slipping from said under-faces.

In testimony whereof I have signed my name to this specification.

LEWIS O. CULVER.